United States Patent Office 2,849,302
Patented Aug. 26, 1958

2,849,302

ANTIKNOCK COMPOSITIONS

Raymond G. Lyben, Detroit, Mich., assignor to Ethyl Corporation, New York, N. Y., a corporation of Delaware No Drawing. Application May 31, 1955
Serial No. 512,284

7 Claims. (Cl. 44—69)

This invention relates to improved antiknock compositions. These compositions encompass antiknock fluids and leaded fuels. In particular, this invention relates to a class of hydrocarbons having a particular molecular structure for use as a scavenger with lead antiknock compounds.

With the discovery of the antiknock effectiveness of organolead compounds, in particular alkyllead compounds such as tetraethyllead, it was found that for efficient operation of the engine, means must be provided to remove the lead-containing products of combustion. The first advance in this art was the discovery that certain organic halogen compounds, when co-present with the lead antiknock compound, reacted in the combustion chamber with the combustion products of the lead antiknock to form volatile lead halides. These lead halides during the exhaust cycle were more or less efficiently removed from the combustion chamber. This process has been called scavenging, and a material capable of so reacting with lead is referred to as a lead scavenger or, more simply, as a scavenger. Choice of a commercial scavenger to date has been based on commercial availability and cost. Thus, up to the present the only scavengers which have enjoyed any commercial success have been ethylene dibromide and ethylene dichloride. Other halogen-containing compounds proposed as scavengers were those which can be introduced into the combustion chambers of the various cylinders of a multi-cylinder engine in the same proportionate ratio as the tetraethyllead. This can be achieved by employing scavengers which have approximately the same relative volatility in the fuel as the tetraethyllead. These scavengers are known as uniformly volatile scavengers. As before, no consideration was given to chemical or physico-chemical properties as they affect the scavenging function.

It is, therefore, an object of this invention to provide antiknock compositions having improved scavenging properties. It is another object of this invention to provide antiknock fluids containing improved scavengers. It is likewise an object of this invention to provide fuels containing lead antiknock agents and improved scavengers. It is a further object of this invention to provide means for operating an internal combustion engine with leaded fuels in a manner wherein the advantages of the lead antiknock are utilized to a maximum degree and the disadvantages are minimized. These and other objects of this invention will become apparent from the following description.

The above and other objects are accomplished by providing antiknock fluids and leaded fuels which contain what I term uniformly stable, double-acting scavengers. These uniformly stable scavengers are poly(t-halo)hydrocarbon compounds in which the halogen-bearing carbon atoms are attached by single bonds to three other nonaromatic carbon atoms, and in which all the halogens are of atomic weight 35 to 81, the compounds being further characterized in that each halogen-bearing tertiary carbon atom is alpha to a separate carbon atom having at least one hydrogen atom attached thereto. That is, each of the tertiary halogens is capable of forming hydrogen halide with a hydrogen atom attached to a different carbon atom which is in a position alpha to the halogen-bearing carbon. In this description the term tertiary carbon atom is defined as a carbon atom which has three other carbon atoms attached thereto by single bonds. Thus, the novel scavenging agents of this invention are certain chlorohydrocarbons, bromohydrocarbons and chlorobromohydrocarbons. The halohydrocarbon scavenging agents of this invention can be derived from alkanes, cycloalkanes, alkenes, cycloalkenes, and hydrocarbon-substituted derivatives thereof. The smallest hydrocarbon radical which can provide a scavenger of this invention contains five carbon atoms; e. g., 1,2-dihalo-1,2-dimethylcyclopropane. In order to provide scavengers having the desirable volatility characteristics with respect to the lead antiknock agent, I prefer to employ uniformly stable scavengers having up to 20 carbon atoms. Thus, it will be seen that the carbon content of my scavengers ranges from 5 to 20 carbons per molecule. A preferred embodiment of my invention comprises polytertiary bromoalkanes having from 6 to 10 carbon atoms as these have more favorable volatility characteristics. In the scavengers of my invention the ratio of carbon-to-halogen can vary between 10:1 and 2:1. However, for best results I prefer to employ compounds having from 2 to 4 halogen atoms.

Thus, it is seen that in general my invention comprises providing halohydrocarbon scavenger-containing lead antiknock fluids and fuels wherein at least one mole percent of halogen in the halohydrocarbon scavenger is present in the form of poly(t-halo)hydrocarbon having 5 to 20 carbon atoms and 2 to 6 halogens in which all the halogens are of atomic weight 35 to 81 and are on tertiary carbon atoms alpha to a carbon atom having at least one hydrogen atom attached thereto, there being a separate hydrogen atom on such alpha carbon for each halogen in the molecule.

With all halogen scavengers, the scavenging effect is achieved by decomposition of the scavenger in the engine to form hydrogen halide which then reacts at some point in the combustion cycle with the decomposition product of the lead antiknock compound to form volatile lead halide. Previously known scavengers produce such hydrogen halide only during or after the advance of the flame front. The scavengers of this invention achieve their enhanced effectiveness because they produce the hydrogen halide not only during and after the advance of the flame front but, more significantly, before the passing of the flame front. It has been established that lead antiknock compounds exert their effectiveness by the production in the combustion chamber of a fog of nonhalogenated inorganic lead, which is probably lead oxide. This lead oxide fog not only is produced before the advance of the flame front but also exerts its influence on knock-inducing components of the combustion chamber gases prior to their combustion in the flame front. The duration of the effectiveness of these antiknock particles is short, because they agglomerate rapidly and the amount of surface exposed to the reactive fuel-air mixture drops off. For best results the active scavenging chemical, hydrogen halide, should be available shortly after the lead oxide particles have exerted their antiknock effect, but before they have agglomerated into large particles or deposited on the walls of the combustion chamber. In order to accomplish this the scavengers must have a rate of decomposition which is closely related to the decomposition rate of tetraethyllead. Thus, there is a supply of hydrogen halide available for reaction with the lead antiknock decomposition products shortly after they have performed their function as antiknocks. Hence, there is more time for reaction between hydrogen halides and the lead antiknock decomposition products under conditions most favorable to such reaction; namely, in the presence of large amounts of oxygen before a given part of the mixture is consumed by the combustion flame. Because the compounds used as scavengers in this invention have a rate of decomposition which is closely related to that of tetraethyllead, they are called uniformly stable scavengers, or, briefly, U. S. scavengers. Of course, any hydrogen halide liberated by the scavenger before the flame but which has not reacted with the lead oxide at that time, will still be available for reaction after burning in the same manner as is accomplished by the conventional scavengers. It is for this reason that the scavengers of the instant invention are also called double-acting scavengers.

The scavenger composition of my new antiknock fluid and fuel mixtures can be described in terms of theories of halogen. A theory of halogen is defined as the amount of halogen which is necessary to react completely with the lead present in the antiknock mixture to convert it to lead dihalide. In other words, there are two atoms of halogen for every atom of lead present.

The outstanding properties and unexpected advantages of my scavengers can be illustrated by the following statement of results: Using a single-cylinder test engine with isooctane fuel containing 13.2 grams of lead as tetraethyllead per gallon and 0.75 theory of bromine as 2,5-dibromo-2,5-dimethylhexane, one of the scavengers of my invention, the amount of deposit on the exhaust valve was only 10 percent as compared with the amount of deposit formed when the same fuel was run through the same engine for the same time with no scavenger present. Thus, the amount of deposit removal was 90 percent. When a similar run was made with 0.75 theory of bromine as ethylene dibromide, a conventional scavenger, only 50 percent deposit removal was obtained as compared with the fuel containing lead but no scavenger. The relative effectiveness in deposit removal of my scavenger over the conventional scavenger was therefore 180 percent. In like manner when the scavenging effectiveness of 2,5-dichloro-2,5-dimethyl hexane and that of 1,3-dichloropropane are compared at concentrations equivalent to 1.50 theories of chlorine, it is found that the former removes 93 percent of the deposit from the exhaust valve as compared to the amount of deposit when no scavenger is present, while the latter removes only 49 percent. Thus, it is seen that the scavenging effectiveness of a poly(t-chloro)hydrocarbon is as much as 190 percent as great as that of a conventional chlorine-containing scavenger.

In tests in which a commercial V–8 engine was run on a typical commercial gasoline containing 3.2 grams of lead per gallon as tetraethyllead and containing a scavenger 1.0 theory of chlorine as ethylene dichloride, and 0.5 theory of bromine as ethylene dibromide (the conventional 62 Mix scavenger), the combustion chamber accumulated 9.51 grams of deposit in 100 hours of engine operation, whereas under identical conditions, except that the scavenger consisted of 1.0 theory of chlorine as ethylene dichloride, 0.25 theory of bromine as ethylene dibromide, and 0.25 theory of bromine as 2,3-dibromo-2,3-dimethylbutane, the latter being a new scavenger of this invention, the amount of deposit formation was only 6.15 grams per 100 hours. This is an increase of over 35 percent in the scavenging effectiveness due to the substitution of 0.25 theory of bromine as one of the new uniformly stable scavengers for the same amount of bromine in the form of the conventional ethylene dibromide.

Another completely novel and unexpected advantage of my present scavengers is that when present at low concentrations they actually enhance the antiknock effectiveness of tetraethyllead or other organolead antiknock agents. For example, when a single-cycle test engine was run on primary reference fuel of 80 octane number containing 3.2 grams of lead as tetraethyllead per gallon and 0.25 theory of bromine as 2,3-dibromo-2,3-dimethylbutane, a new scavenger of this invention, an actual increase of 27 percent in the effectiveness of the tetraethyllead was observed. That is, the antiknock action of the fuel blended with the new scavenger was equal to the antiknock action that could be achieved by adding an additional 27 percent of tetraethyllead to the fuel used. Scavengers of this invention provide the only known actual enhancement of antiknock effectiveness of organolead antiknock compounds by scavengers.

The poly(t-halo) hydrocarbons employed as scavengers according to this invention fall into two categories; one consists of compounds having 5 to 20 carbon atoms which constitutes the broad class of compounds of my invention, the other category is the preferred class of my invention and comprises compounds having from 6 to 10 carbon atoms in the molecule. Various non-limiting examples of the improved double-acting, uniformly stable scavengers of this invention are as follows:

Typical haloalkane scavengers of this invention include 2,3 - dibromo - 2,3 - dimethylbutane; 2,5 - dichloro - 2,5-dimethylhexane; 2,4-dibromo-2,4-dimethylpentane; 2,3-dichloro - 2,3,4,4 - tetramethylpentane; 3,5 - dibromo-3-methyl-5-ethylheptane; chlorinated and brominated polypropylenes and polybutylenes having up to 10 carbon atoms in which the halogens are attached to tertiary carbon atoms, which illustrate the preferred species of the scavengers of my invention. Examples of haloalkane scavengers having more than 10 carbon atoms and which are also part of my invention, are 2,6-dichloro-2,4,4,6-tetramethyloctane; 2,4 - dibromo - 6 - chloro - 2,4,6,8-tetramethyldodecane; 2,6 - dichloro - 2,4,4,6 - tetramethylcetane; 2,4,6,8,10,12 - hexabromo - 2,4,6,8,10,12 - hexamethyltetradecane, and the like. It will be noted that in each of the compounds named there is at least one individual carbon atom having a hydrogen attached thereto for each halogen and this carbon atom is located in a position alpha to the halogen-bearing tertiary carbon. This is true for all the compounds of this invention.

Typical haloalkane scavengers of this invention include 1,4 - dibromobicyclo[2.1.0]pentane; 1,4 - dichlorobicyclo [2.2.0]hexane; 1 - chloro - 4 - bromo - 7,7 - dimethyl-bicyclo[2.2.1]heptane; 1,2,3 - trichloro - 1,2,3 - trimethyl-cyclopropane; 1,3 - dibromo - 1,3 - dimethylcyclobutane; 1 - bromo - 3 - chloro - 1,3 - dimethyl - 4 - ethylcyclo-pentane; 1,3 - dibromo - 1,3 - dimethylcyclohexane; 1,4-dichloro - 1,4 - diethylcyclohexane; 1,2 - dibromo - 1,2-dimethyl-1-cyclopentylpropane, which constitutes part of the preferred species of this invention; and compounds having more than 10 carbon atoms, such as 1,3-dibromo-1,3 - diisopropylcyclohexane; 2,5 - dibromo - 2,5 - dimethyl - 6 - phenylcyclohexane; and 2,5 - dichloro - 2,5-dimethyl - 1,6 - diphenylcyclohexane.

Non-limiting examples of haloalkene scavengers of this invention include 3,4-dibromo-3,4-dimethylpentene-1; 3,6-dichloro - 3,6 - dimethyloctene - 4; 2 - chloro - 5 - bromo-2,5-dimethylheptene-3, which constitute some of the preferred scavengers; and haloalkene compounds having more than 10 carbon atoms, such as 3,4-dibromo-3,4-dimethyldecene - 1; 2,4 - dichloro - 2,5 - diethyldodecene-3; 3 - bromo - 5 - chloro - 3,5 - diethyl - 10 - phenyl-decene-1, and the like.

Non-limiting examples of halocycloalkene scavengers of this invention include 1,2-dichloro-1,2-dimethylcyclo-butene - 3; 1,2 - dibromo - 1,2 - dimethylcyclopentene - 3; 1 - chloro - 3 - bromo - 1,3 - diethyl - cyclohexene - 4; which fall within the preferred class of compounds in this invention and 1,3 - dibromo - 1,3 - dimethyl - 2,4 - di-isopropylcyclohexene - 4; 1,3 - dibromo - 1,3 - dibutyl-cyclooctane - 5; 2 - bromo - 4,7 - dichloro - 2,4,7 - tri-methyl-8-(4-propylcyclohexene-1-yl) octane, which illustrate compounds having between 11 and 20 carbon atoms.

The halohydrocarbon scavengers of this invention can be prepared by various methods. One method is the photohalogenation of a saturated hydrocarbon as, for example, the photobromination of 2,5-dimethylhexane to get 2,5-dibromo-2,5-dimethylhexane. Another method is the addition of halogen to an olefin, as, for example, the addition of bromine to 2,3-dimethylbutene-2 to give 2,3-dimethyl-2,3-dibromobutane. Still another method is the reaction of HCl or HBr or a mixture of the two with poly(t-hydroxy)hydrocarbons, such as the reaction of HCl with 1,2-dihydroxy-1,2-dimethylcyclohexane to give 1,2-dichloro-1,2-dimethylcyclohexane. Other methods will be apparent to those skilled in the art.

It has been found that the scavengers of this invention can be used in several different formulation or blend types. Principal among these are (a) blends or fluids in which my scavengers are the sole scavenging agents, (b) fluids in which the new scavengers are added to conventional antiknock fluids to supplement the scavengers therein, and (c) those in which the new scavengers replace a portion of the scavenger in a conventional antiknock fluid. The scavengers of this invention can, in general, be used in admixture with other scavengers in any proportion within the limits of the over-all amounts of scavenger employed in my antiknock fluids as stated below. Furthermore, mixtures of my scavengers can be so used as well as individual scavengers.

My scavengers can be employed together with any other scavenging agent or mixture of two or more of them. For example, the poly(t-halo)compounds of this invention can be added to organo-lead antiknock fluids containing 0.5 theory of bromine as ethylene dibromide and 1.0 theory of chlorine as ethylene dichloride or any combination of theories of these two components as, for example, those described in U. S. Patent 2,398,281. The poly(t-halo)compound can also be employed with one theory of bromine as ethylene dibromide or amounts of the latter either greater or less than one theory. Other scavenger compositions that can be employed together with the poly(t-halo)compounds are those having a vapor pressure of substantially 0.2 to 6 mm. of mercury at 50° C. as, for example, the compositions described in U. S. Patents 2,479,901 and 2,479,903. My scavenging agents can likewise be used with compositions of the kind described in U. S. Patents 2,364,921; 2,479,902; 2,490,606; 2,496,983; etc. It is not intended that mixed scavengers in the fluids and fuels of this invention be limited to mixtures of my new scavenger with the above-mentioned conventional scavengers, but they may be employed together with any hydrocarbon fuel-soluble organic halide scavenger compounds consisting of carbon and elements selected from the group consisting of bromine, chlorine, hydrogen, nitrogen and oxygen. In addition, my scavengers can be employed with deposit modifying compounds not containing halogens, for example, organophosphorus compounds, and the like. In any event a scavenger of this invention is always present so that the amount of halogen which it provides represents at least one mole percent of total halogen in the scavenger mixture.

In general, good results are obtained when the antiknock mixtures are so composed that the amount of halogen present ranges between 0.1 and 4.0 theories. This includes not only the amount of new scavenger but also the amount of prior art scavenger, if any, so that the above range applies to the total amount of halogen present in the antiknock fluid. For most outstanding results, I prefer that the total amount of halogen be between 0.15 and 2.0 theories, as at least 0.15 theory should be present to give good scavenging results, while not much additional scavenging benefit is obtained when more than 2.0 theories are used.

Referring to the three principal blend types listed above, when I use type (a) above in which my scavengers are the sole scavenging agents, I prefer to use between 0.1 and 1.5 theories of halogen. For the greatest benefit I use poly(t-chloro)hydrocarbons in the extent of 0.3 to 1.5 theories and poly(t-bromo)hydrocarbons in amount between 0.15 and 0.75 theories. When a mixture of the chloride and bromide is used the amount of each will vary according to a relationship which will be shown below.

With fluid type (b), that is, a fluid in which my new scavengers are added to conventional antiknock fluids to supplement the scavengers therein, I use an amount of the novel scavenger between 0.01 and 0.5 theory and regulate the total amount of halogen in the form of both new and conventional scavengers to lie between 0.1 and 4.0 theories, the preferred range being 0.15 to 2.0 theories as indicated above.

With fluid type (c), those in which my scavengers replace a portion of the scavenger in a conventional antiknock fluid, I adjust the components so that the total halogen is 0.1 to 4.0 theories, preferably 0.75 to 2.0 theories, and the portion of this which is in the form of my novel scavenger ranges between 0.01 and 1.0 theory, preferably 0.01 to 0.5 theory.

It has been found that the relative scavenging effectiveness of bromine-containing compounds and chlorine-containing compounds vary depending on the engine operating conditions. Thus, under light-load operations as in passenger car service when engine surface temperatures are low, the scavenging efficiency of chlorine-containing compounds is much lower than that of similar bromine-containing compounds. On the other hand, when the engine temperature is relatively high, as is the case in heavy-duty truck operation, the scavenging effectiveness of chlorine in the form of a chlorine-containing compound is considerably higher than under low temperature conditions while the bromine-containing compounds show a trend in the opposite direction. Taking an over-all average over varying engine operating conditions, it may be said that chlorine in the form of a chlorine-containing compound is approximately one-half as effective in removing deposits from exhaust valves and spark plugs as an equivalent number of theories of bromine in the form of a similar bromine-containing compound. Accordingly, a convenient method for expressing the total number of theories of halogen in a lead-containing antiknock fluid or fuel is in terms of the scavenging effectiveness of bromine. For example, since a chlorine-containing compound is on the average only about one-half as effective a scavenger as a similar bromine-containing compound, it will require about twice as much of the chloro compound to obtain the same deposit removing effect as of an equivalent amount of a bromine compound. In this regard it should be pointed out that I use the upper limit of 4.0 theories of halogen when employing only chlorine-containing scavengers, since the same amount of effectiveness is obtained with 2.0 theories of bromine and, by the same token, I use the lower limit of 0.1 theory of halogen when a bromine-containing scavenger is the sole scavenging constituent, since an equivalent amount of chlorine is 0.2 theory. Thus, if X is the number of theories in terms of bromine effectiveness required in a scavenging composition, it is convenient to determine the make-up of a desired fluid with respect to the proportions of chlorine scavenger and bromine scavenger by use of the equation $$1/2 T_{Cl} + T_{Br} = X$$

In this equation $T_{Cl}$ represents the number of theories of chlorine and $T_{Br}$ represents the number of theories of bromine. The limits set for X correspond to the total bromine scavenging effectiveness desired. Therefore, X can range between 0.1 and 2.0. To determine the halogen-containing scavenger composition of a fluid or fuel by means of this equation, I first select the total number of theories of halogen in terms of bromine scavenging effectiveness desired and substitute this number for X in the equation. Then I select the number of theories of either chlorine or bromine which I wish to use. The equation is next solved for the remaining unknown. By this method the composition of the fluid is determined in so far as the scavenger is concerned.

For example, suppose that it is desired to make up a fluid whose effectiveness in terms of bromine scavenger is equal to 1.5 theories and suppose further that it is desired to use 1.2 theories of chlorine scavenger in this fluid. Placing these numbers in the above equation there is obtained the expression $1/2(1.2)+T_{Br}=1.5$. Solving this equation for $T_{Br}$ it is found that 0.9 theory of bromine scavenger should be used.

The values of X in the above equation can vary from 0.1 to 2.0. Therefore, the equation holds true for values of $T_{Cl}$ ranging from zero to 4.0 while the value of $T_{Br}$ changes from 2.0 to zero. When the new scavengers of this invention are the sole scavenging agents, the preferred range of values for X is 0.15 to 0.75 and the equation will then embody the range of values of the theories of halogen between the upper and lower limits that can be used as stated hereinabove.

The use of the novel scavengers of this invention either alone or in combination with other scavengers possesses a number of advantages in addition to those mentioned above. One advantage is that by using the scavengers of the instant invention a scavenging effect equivalent to that of conventional scavengers can be obtained with a much lower concentration of halogen based on the lead present. For example, a scavenger mixture consisting of one theory of chlorine as ethylene dichloride plus 0.2 theory of bromine as 2,3-dibromo-2,3-dimethylbutane has essentially the same scavenging effect as 62 Mix, which is made up of one theory of chlorine as ethylene dichloride and 0.5 theory of bromine as ethylene dibromide. This in turn reduces the corrosion effects due to hydrohalic acids on various engine parts, such as cylinder walls, intake and exhaust valves, mufflers, etc. On the other hand, when a combination of conventional scavengers and the scavengers of the instant invention are employed in an amount such that the concentration of halogen is equivalent to that commercially in use at present, a greatly increased scavenging effect is obtained. An example of this is the substitution of a small amount of a poly(t-halo)hydrocarbon for part of the halogen compound of a conventional scavenger mixture to give, for example, an antiknock fluid which contains as scavengers 1.0 theory of chlorine as ethylene dichloride, 0.4 theory of bromine as ethylene dibromide and 0.1 theory of bromine as 2,5-dibromo-2,5-dimethylhexane. This antiknock fluid when employed in gasoline in a spark ignition engine shows a marked improvement in scavenging effect over an equivalent amount of bromine and chlorine as ethylene dihalides. It can readily be seen that by taking advantage of these various benefits a great deal of flexibility can be achieved in tailormaking fluids to meet any requirement.

In blending the antiknock fluids with fuels, I regulate the amount of antiknock fluid so that the amount of lead present in the fuel varies between 0.02 and 13.2 grams per gallon. It is to be understood that I may obtain my finished fuels by blending the various ingredients of my antiknock fluids separately or in any sub-combination with the fuels as well as blending the finished antiknock fluids with the fuels.

The following examples illustrate various antiknock fluids and fuels of this invention.

EXAMPLE I

Ninety-eight parts (1.0 theory) of ethylene dichloride, 94 parts (0.5 theory) of ethylene dibromide, and 7.38 parts (0.03 theory) of 2,3-dibromo-2,3-dimethylbutane are admixed with efficient stirring with 323 parts of tetraethyllead. This gives an antiknock fluid in which the conventional fluid commonly known as 62 Mix has been supplemented by one of my new scavengers.

To obtain a finished fuel, the above described fluid is blended with gasoline so that the amount of lead present is 0.79 gram per gallon.

EXAMPLE II

To 323 parts of tetraethyllead is added with good stirring 98 parts (1.0 theory) of ethylene dichloride, 76 parts (0.4 theory) of ethylene dibromide, and 13 parts (0.05 theory) of 2,3-dibromo-2,3-dimethylpentane.

To obtain a finished fuel, I blend the above fluid with gasoline so that it is evenly distributed throughout the gasoline and so that the amount of lead present in the gasoline is 7.5 grams per gallon.

EXAMPLE III

To 379 parts of tetrapropyllead is added 18.2 parts (0.1 theory) of 2,5-dichloro-2,5-dimethylhexane.

This is blended with gasoline in relative amounts so that the finished fuel contains 3.16 grams of lead per gallon.

Valuable antiknock fluids are also obtained when Example III is repeated with the amounts varying so that the amount of scavenger is as high as 2.0 theories. For best results I prefer to blend so that when I use a poly(t-chloro)hydrocarbon, the amount ranges between 0.3 and 1.5 theories of chlorine, and so that when I use a poly(t-bromo)hydrocarbon, the amount of scavenger varies between 0.15 and 0.75 theory of bromine.

EXAMPLE IV

To 323 parts of tetraethyllead is added 61.5 parts (0.25 theory) of 2,3-dibromo-2,3-dimethylbutane and 133 parts (0.5 theory) of 2,4-dichloro-2,4-diethyldecane. This gives an antiknock fluid wherein my new scavengers comprise the only scavengers present and wherein the total theory of halogen is 0.75.

This fluid is admixed with gasoline so that the total amount of lead present, which is uniformly distributed throughout the fuel, is 4.22 grams per gallon.

I also make blends which consist of tetraethyllead plus two bromo compounds, tetraethyllead plus two chloro compounds, and tetraethyllead plus a chlorine compound and a bromine compound different from those above as, for example, tetraethyllead with 0.3 theory of ethylene dibromide and 0.5 theory of 2,3-dibromo-2,3-dimethylbutane; and tetraethyllead with 0.9 theory of ethylene dichloride and 1.0 theory of 2,5-dichloro-2,5-dimethylhexane.

EXAMPLE V

To 323 parts of tetraethyllead is added 190 parts (one theory) of ethylene dibromide and 27.4 parts (0.1 theory) of 2,5-dibromo-2,5-dimethylhexane. This composition gives an antiknock fluid wherein the scavengers comprise in part compounds of this invention and the scavengers used in 1–T mix (one theory of ethylene dibromide). The total amount of scavenger is equivalent to 1.1 theories of bromine based on the amount of lead present.

The above fluid is added to gasoline with appropriate agitation so that when uniformly distributed throughout the fuel the concentration of the fluid is equivalent to 2.0 grams of lead per gallon of fuel.

In like manner, fluids and fuels are prepared containing tetraethyllead together with the scavengers mentioned above in this example. A variation of the scavenger mix used herein is to combine 1 to 0.1 theory of ethylene dibromide with from 0.01 to 1.0 theory of a poly(t-halo)-hydrocarbon, such as 3,7-dichloro-3,7-di-tertiarybutyl-octane, 3-bromo-3,5-diisopropylheptane, etc.

EXAMPLE VI

To 351 parts of diethyl diisopropyllead is added 94 parts (0.6 theory) of ethylene dibromide and 53.4 parts (0.2 theory) of 2,5-dichloro-2,5-dimethyldodecane, providing an antiknock fluid containing 0.8 theory of halogen based on the lead present.

This fluid is blended with fuel of the gasoline boiling range in amount such that the concentration of lead is 2.6 grams of lead per gallon.

Other fluid and fuel compositions are made up in which the amount of ethylene dibromide varies from 0.2 to 0.95 theory and the amount of the highly effective scavengers of this invention vary from 0.05 to 0.8 theory. Examples of other new scavengers that can be mixed with ethylene dibromide are illustrated by compositions, such as 0.2 theory of bromine as ethylene dibromide together with 0.8 theory of bromine as 2,3,4,5-tetrabromo-2,3,4,5-tetramethylhexane; 0.6 theory of ethylene dibromide and 0.3 theory of 3,4-dichloro-3,4-diethyloctane, and the like.

EXAMPLE VII

To 419 parts of diphenyldiethyllead is added 73.4 parts (0.3 theory) of 2,3-dibromo-2,3-dimethylbutane and 82.6 parts (0.4 theory) of 1,2,3-tribromopentane. This constitutes an antiknock fluid wherein the scavenger consists of two components, one of which is the new scavenger of this invention and the other is a member of the class known as uniformly volatile scavengers.

The antiknock fluid is blended with fuel of the gasoline boiling range in amount such that the concentration of the lead is 4.0 grams per gallon.

Other combinations that can be employed using the very effective compound of this invention and uniformly volatile halogen-containing halohydrocarbons having a vapor pressure of from 0.2 to 6.0 mm. of mercury at 50° C. are 0.2 theory of 2,5-dichloro-2-methyl-5-ethyloctane and 0.8 theory of 6-bromo-4)bromomethyl(heptene-1; 0.36 theory of 2,4-dibromo-2-methyl-4-phenylhexane and 3.64 theory of 5,6-dichloro-3,3-dimethylhexane, etc.

EXAMPLE VIII

To 323 parts of tetraethyllead is added 14.9 parts (0.05 theory) of 3,4-dibromo-3-methyl-4-ethylheptene-1 and 596 parts (3.95 theory) of 4-chloro-1-($\beta$-chloroethyl)benzene. This provides an antiknock fluid wherein the scavengers of this invention are employed together with UV scavengers of the type embodied in U. S. 2,479,901 of which the latter is a monohaloalkylbenzene compound having 8 carbon atoms and having a bromine attached to the benzene ring and having a vapor pressure in the range of from 0.2 to 6.0 mm. of mercury at 50° C.

This antiknock fluid is mixed with gasoline in proportions to give a concentration of 0.02 gram of lead per gallon of the fuel. I also make blends of fluids and fuels containing tetraethyllead and a mixture of the uniformly volatile scavengers together with compounds of this invention, such as 0.1 theory of chlorine as 2,5-dichloro-2,5-dimethyl-6-cyclohexane and 1.5 theory of chlorine as mixed dichloroxylenes; 0.01 theory of bromine as 2,4-dibromo-2,4-dimethyl-5-naphthylpentane and 0.14 theory of bromine as 2-bromo-1,3-dimethylbenzene, and the like.

EXAMPLE IX

To 267 parts of tetramethyllead is added 263 parts (0.75 theory) of 3,5-dichloro-3,5-diethyloctane and 126 parts (1.0 thory) of 3,4,6-trichloro-1,2-dimethylbenzene. This gives an antiknock fluid wherein the scavengers of this invention are employed together with uniformly volatile scavengers of the kind embodied in U. S. 2,479,903.

To make up a fuel for spark ignition engines, the above fluid is blended with a hydrocarbon of the gasoline boiling range in proportion such that the concentration of lead is 3.1 grams of lead per gallon.

I also make blends of fluids and fuels wherein the lead compound is dimethyl diethyllead and the scavengers comprise such combinations as 0.1 theory of bromine as 2,5-dibromo-2,5-dimethylhexane and 1.8 theories of chlorine as 1,2,3-trichlorobenzene; 0.5 theory of chlorine as 2,6-dichloro-2,4,4,6-tetramethyloctane and 1.5 theory of chlorine as 3,4-dichlorocumene. The uniformly volatile scavengers used herein have a vapor pressure in the range of 0.2 to 6.0 mm. of mercury at 50° C.

EXAMPLE X

To 323 parts of tetraethyllead is added 94 parts (0.5 theory) of ethylene dibromide, 99 parts (1.0 theory) of ethylene dichloride, and 0.05 theory of bromine in the form of 2,3-dibromo-2,3-dimethylbutane. The antiknock fluid thus prepared is then blended with a fuel of the gasoline boiling range in amount such that the concentration of lead is 3.0 grams of lead per gallon.

Other compositions are also prepared in which the amount of scavenger in the fluid and/or fuel, based on the amount of lead present, is illustrated by compositions such as 0.5 theory of bromine as ethylene dibromide, 1.0 theory of chlorine as ethylene dichloride and 0.1 theory of chlorine in the form of 2,3-dichloro-2,3-dimethylbutane; 0.5 theory of bromine as ethylene dibromide, 1.0 theory of chlorine as ethylene dichloride together with 0.03 theory of bromine as 2,5-dibromo-2,5-dimethylhexane and 0.04 theory of chlorine as 2,3-dichloro-2,3-dimethylbutane.

EXAMPLE XI

To 100 parts of tetraethyllead is added 47 parts (0.25 theory) of ethylene dibromide, 99 parts (1.0 theory) of ethylene dichloride and 42.7 parts (0.175 theory) of 2,3-dimethyl-2,3-dibromobutane. The fluid thus prepared is blended with hydrocarbons of the gasoline fuel boiling range in amount such as to give a concentration of 3.18 grams of lead per gallon.

In like manner, antiknock fluid and fuel compositions are prepared in which the scavenger compositions are 0.45 theory of bromine as ethylene dibromide, 1.0 theory of chlorine as ethylene dichloride and 0.075 theory of bromine as 2,4,6,8,10,12-hexabromo-2,4,6,8,10,12-hexamethyltetradecane; and a composition containing 0.9 theory of ethylene dibromide, 0.6 theory of ethylene dichloride and 0.05 theory of bromine in the form of 2,6-dibromo-2,4,4,6-tetramethylcetane.

EXAMPLE XII

To 323 parts of tetraethyllead is added 61 parts (0.25 theory) of 2,3-dibromo-2,3-dimethylbutane and 62.5 parts (0.25 theory) of 2-bromoethanol-1. This mixture is thoroughly agitated to insure even distribution of the scavenger in the tetraethyllead fluid. The fluid is then blended with a hydrocarbon fuel of the gasoline boiling range in amount such as to give a concentration of 0.5 gram of lead per gallon of fuel.

Fluid and fuel compositions are also made up in which the scavenger content is composed of compositions such as 0.1 theory of 2,5-dibromo-2,5-dimethylhexane, 0.15 theory of tertiary butylbromide, 0.1 theory of 3,5-dichloroheptane and 0.5 theory of diethyl-dibromomalonate and 0.15 theory of 1-bromo-1-phenylethane. Mixtures of any combination of two or more of these scavengers can also be used with good effect.

When the fuels described in the above examples are employed in the operation of spark-fired internal combustion engines, greatly improved deposit removal is observed, as compared to fuels containing conventional or prior art scavengers only with the same relative halogen-to-lead ratio.

The scavenging efficiency of the poly(t-halo)hydrocarbons of this invention is demonstrated by the low deposit remaining when single cylinder laboratory engines are operated on leaded fuels containing these scavengers. The engines were standard CFR L-head engines operated at full throttle at 900 R. P. M. with a fuel-to-air ratio of 0.082. The fuel was isooctane containing 12.5 ml. of tetraethyllead (13.20 g. of Pb) per gallon together with a scavenger. The amount of fuel consumed per run was 7 lbs., 14 oz. The results obtained are illustrated by the following table. The percent deposit remaining is corrected to the values corresponding to 0.75 theory of bromine for bromine compounds and to 1.50 theories of chlorine for chlorine compounds.

Table I

| Halohydrocarbon | Theories of halogen | Deposit on exhaust valve, mg. Pb | Percent deposit remaining |
|---|---|---|---|
| No scavenger: Tetraethyllead | 0 | 180.0 | 100 |
| Part I | | | |
| Scavengers of this invention: | | | |
| 2,3-dibromo-2,3-dimethylbutane | 0.76 | 15.4 | 9.0 |
| 2,5-dibromo-2,5-dimethylhexane | 0.75 | 18.3 | 10.0 |
| 2,3-dichloro-2,3-dimethylbutane | 1.54 | 52.0 | 30.0 |
| 2,5-dichloro-2,5-dimethylhexane | 1.51 | 9.4 | 7.0 |
| Prior art scavengers: | | | |
| 1,4-dibromobutane | 0.76 | 86.6 | 49 |
| 1,1-dibromoethane | 0.76 | 88.0 | 49 |
| Ethylene dibromide | 0.77 | 89.6 | 50 |
| 1,1-dichloroethane | 1.51 | 84.1 | 48 |
| Ethylene dichloride | 1.53 | 91.0 | 52 |
| 1,3-dichloropropane | 1.47 | 92.9 | 51 |
| 1-chlorobutane | 1.48 | 89.7 | 49 |
| Ethylene dibromide plus | 0.375 | 88.0 | 51 |
| Ethylene dichloride | 0.75 | | |
| Part II [1] | | | |
| Mixtures of new and prior art scavengers: | | | |
| 2,3-dibromo-2,3-dimethylbutane plus | 0.10 | 6.6 | 3.6 |
| Ethylene dibromide plus | 0.40 | | |
| Ethylene dichloride | 1.00 | | |
| 2,3-dibromo-2,3-dimethylbutane plus | 0.25 | 5.4 | 3.0 |
| Ethylene dibromide plus | 0.25 | | |
| Ethylene dichloride | 1.00 | | |
| 2,3-dibromo-2,3-dimethylbutane plus | 0.10 | 4.3 | 2.5 |
| Ethylene dibromide plus | 0.50 | | |
| Ethylene dichloride | 1.00 | | |
| Prior art scavenger: | | | |
| Ethylene dibromide plus | 0.50 | 12.8 | 7 |
| Ethylene dichloride | 1.00 | | |

[1] The figures in this part of the table represent the actual percent of deposit removed by the scavengers employed.

Other compounds of this invention that show similarly high deposit removal efficiency include 3-bromo-6-chloro-3,6-dimethyloctane; 2,3-dibromo-2,4-dimethylhexane; 2,7-dichloro-4,5,6,6-tetramethyl-2,3,3,7-tetraethyloctane; 2,3-dibromo-2,3-dimethyl-5-cyclohexylpentane; 2,4-dichloro-2,4-dimethyl-6-phenylhexane.

From the comparisons of Table I, it is seen that the scavenging agents of this invention are as much as 190 percent as effective as the compounds of the prior art in removing deposits. It is also seen that a replacement of 0.1 theory of bromine of a mixture of prior art scavenger by an equivalent amount of bromine as one of the compounds of this invention reduces the deposit remaining by 48.6 percent. This further illustrates the advantage of employing the compounds of this invention in mixture with other scavenger compounds.

To further illustrate the effectiveness of the compounds of this invention as scavengers, tests were conducted in a V-8 engine of modern design for the purpose of determining exhaust valve life and combustion chamber deposit. The engine was operated on a cycling schedule consisting of 120 seconds at 2500 R. P. M. at about 105 H. P., which is equivalent to road load. The engine was operated in each case on a fuel comprising a blend of straight run, thermally cracked and catalytically cracked stock containing 0.05 percent sulfur in the form of sulfur compounds and 3 ml. of tetraethyllead per gallon. In one instance the scavenger was 62 Mix and in the other the 62 Mix bromine was partially replaced with 2,3-dibromo-2,3-dimethylbutane, a scavenger of this invention. Results are shown in Table II.

Table II

| Scavenger | Average time to 2 valve failures, hours | Combustion chamber deposit, average cylinder | |
|---|---|---|---|
| | | grams | g./100 hours |
| 0.5 T ethylene dibromide plus 1.0 T ethylene dichloride | 174 | 17.7 | 9.51 |
| 0.25 T 2,3-dibromo-2,3-dimethylbutane plus 0.25 T ethylene dibromide plus 1.0 T ethylene dichloride | 238 | 19.4 | 6.15 |

From Table II it is seen that replacing one-half of the bromine in 62 Mix with a poly(t-halo)hydrocarbon of this invention increases the exhaust valve life by 37 percent and the rate of accumulation of combustion chamber deposit is reduced by more than 35 percent.

In similar tests it was found that the average time until three spark plugs had failed was increased 40 percent by replacement of all the bromine in 62 Mix with 2,3-dimethyl-2,3-dibromobutane.

To compare the effect on exhaust valve life of tetraethyllead-containing fuel containing 1.0 theory of ethylene dichloride and 0.6 theory of ethylene dibromide as scavenger (I), with the effect of the same fluid in which 0.1 theory of bromine as 2,3-dibromo-2,3-dimethylbutane replaced an equivalent amount of bromine as ethylene dibromide (II), tests were run in a single cylinder test engine. This engine, having a displacement of 17.6 cubic inches and a compression ratio of 5.6:1, was operated at 2700 R. P. M. on a fuel-to-air ratio of 0.07 on a fuel consisting of technical isooctane containing 3 ml. of tetraethyllead per gallon. The fuel had a sulfur content of 0.05 percent. An average of four tests, in which the engine was operated until the exhaust valve failed, gave an average valve life of 125 hours when operating on a fuel containing scavenger mixture I. When, however, scavenger mix II was employed in the fuel, the average valve life, calculated from three tests, was 193 hours. This represents an average valve life which is more than 154 percent as long as that when scavenger mix I is employed.

Other tests were conducted to determine the relative efficiency of the compounds used according to this invention as scavenging agents as compared to prior art scavengers. In one such test a 17.6 cubic inch engine was operated at 2700 R. P. M. at a fuel-to-air ratio of 0.07 for 120 hours on isooctane fuel containing 6 ml. of tetraethyllead and 0.05 percent sulfur together with various scavengers. An example of the results obtained by this method when different scavengers were employed is shown in the following table.

Table III

| Theories | Scavenger | Deposit weights, grams | | |
|---|---|---|---|---|
| | | Combustion chamber | Spark plug | Exhaust valve |
| 1.0 | 2,3-dibromo-2,3-dimethylbutane | 14.21 | 0.437 | 0.200 |
| 1.0 | Ethylene dibromide | 17.74 | 1.586 | 1.625 |
| 0.5 | Ethylene dibromide plus ethylene dichloride | 24.51 | 1.541 | 1.466 |

These tests show that the poly(t-halo)hydrocarbons are greatly superior to prior art scavengers in deposit removal efficiency. They are especially beneficial for the removal of deposits from exhaust valves and spark plugs where deposit problems are more troublesome. Similar reduction in deposits are obtained when other fluids of this invention are used.

A further illustration of the efficient manner in which the poly(t-halo)hydrocarbon compounds of this invention remove combustion chamber deposits when employed in lead-containing fuels is illustrated by a test in which a known amount of deposit is removed from a thermal plug in an experimental engine. In this procedure a single cylinder engine having a displacement of 17.6 cubic inches was equipped with a plug which fitted into the combustion chamber and which could be maintained at any desired temperature by externally controlled heating means. A precoat of known weight and composition was first laid down on the thermal plug by operating the engine in the normal manner with tetraethyllead but no scavengers in the fuel. The thermal plug was then removed and the combustion chamber shell-blasted to remove as much deposit as possible. The thermal plug with a known amount of deposit was then reinstalled in the clean engine and subjected to an additional period of operation on a nonleaded isooctane fuel containing 10.2 grams of bromine per gallon (equivalent to 1.0 theory of bromine for 12.5 ml. of tetraethyllead per gallon) in the form of 2,3-dimethyl-2,3-dibromobutane. The test was repeated using ethylene dibromide. It was found that the former was 325 percent as effective as the latter in the removing of the deposit from the thermal plug at 600–1100° F. Similar results are obtained when other poly(t-halo)alkyl compounds of this invention are employed.

In order to illustrate the antiknock enhancement effect that the poly(t-halo)alkyl compounds have when used in fuels containing tetraethyllead, fuel compositions were made up in the following manner. To a mixture corresponding to 80 percent by volume of isooctane and 20 percent by volume of n-heptane containing 3.0 ml. of tetraethyllead per gallon were added various poly(t-halo)hydrocarbons in the amounts shown below. The antiknock quality of the fuel mixture was then determined in a single cylinder ASTM standard knock test engine. This engine has a variable compression ratio and was operated at 900 R. P. M. with the temperature of the jacket maintained at 300° F. The engine has a variable spark advance and the fuel-to-air ratio is adjusted for maximum knock. This is known as the motor method of rating fuels for octane number. The results of various tests conducted with fuels containing different tertiary haloalkyl compounds as scavengers are contained in the table below. The "percent enhancement of the tetraethyllead (TEL) effect" represents percentage increase in the amount of TEL that would be required in addition to that already present in the fuel in order to give an antiknock enhancement equivalent to that observed when the poly(t-halo)hydrocarbons were employed.

Table IV.—*Antiknock enhancement by halogen compounds as measured in 80 octane number. Primary reference fuel containing 3.00 ml. tetraethyllead/gal.*

| Theories of halogen | Compound | Octane No. | Percent enhancement of TEL effect |
|---|---|---|---|
| 0 | No halogen compound | 96.4 | 0 |
| 0.25 | 2,3-dibromo-2,3-dimethylbutane | 97.5 | 26.6 |
| 0.5 | do | 97.2 | 10.0 |
| 0.25 | 2,5-dichloro-2,5-dimethylhexane | 98.3 | [1]4.0 |

[1] The comparison in this case is made with an 80 octane primary reference fuel containing 3.02 ml. of TEL/gal.

In addition to the benefits obtained as noted above upon employing the deposit scavenging compounds of this invention, it is also found that the use of many of these scavengers minimizes the octane requirement increase of engines operated on commercial fuels. This increase in octane requirement is a phenomenon observed as the time of operation of an engine is lengthened. It is due to deposits which are built up on various parts of the combustion chamber with the result that a fuel of a quality higher by several octane numbers is required to provide a performance equivalent to that of a clean engine or combustion zone. The poly(t-halo)hydrocarbon scavengers of this invention tend to minimize this octane requirement increase.

The scavengers of this invention may be used with organolead or hydrocarbolead compounds in general. Examples of such compounds, including tetraalkyllead and alkylaryllead compounds other than tetraethyllead are, tetrapropyllead, dimethyldiethyllead, methyltriethyllead, diethyldiphenyllead, tetrabutyllead, and the like, as well as mixtures of these compounds. The amount of lead compounds employed will vary from about 0.02 to 13.2 grams of lead per gallon, depending on the engine it is to be used in and the kind of fuel employed.

The antiknock composition of this invention may contain other components besides lead antiknock compounds and the poly(t-halo)alkyl compounds as scavengers. Such other components may be solvents, such as toluene or kerosene or other hydrocarbons. They may also contain dyes which are often used for purposes of identification of fluids. Likewise, antioxidants such as alkylated phenols and amines, metal deactivators, phosphorus compounds and other antiknock agents such as amines and metal carbonyls, anti-rust and anti-icing agents and wear inhibitors may also be added to the antiknock compostion or fuel containing the same. In like manner the fuels to which the antiknock compositions of this invention are added may have a wide variation of composition. These fuels generally are petroleum hydrocarbons and are usually blends of two or more components. These fuels can contain all types of hydrocarbons, including paraffins, both straight and branched chain; olefins, cycloaliphatics containing paraffin or olefin side chains; and aromatics containing aliphatic side chains. The fuel type depends on the base stock from which it is obtained and on the method of refining. For example, it can be a straight run or processed hydrocarbon, including thermally cracked, catalytically cracked, reformed, etc. The boiling range of the components of gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at a particular intermediate temperature.

The hydrocarbon fuels in which the antiknock agent of this invention can be employed often contain minor quantities of various impurities. One such impurity is sulfur, which can be present either in a combined form as an organic or inorganic compound or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

Having fully described the nature of the improved antiknock fluids and fuels obtained according to this invention, it is not intended that this invention be limited except within the scope of the appended claims.

I claim:

1. A halohydrocarbon scavenger-containing organolead antiknock fluid wherein at least one mole percent of halogen in the scavenger is present in the form of poly(t-halo)hydrocarbons having 5 to 20 carbon atoms in which the halogens are of atomic weight 35 to 81 and are on tertiary carbon atoms alpha to carbon atoms having at least one hydrogen atom attached thereto; the total amount of said halohydrocarbon scavenger being in the range of 0.1–4.0 theories based on the amount of organolead compound present and the total amount of said poly(t-halo)hydrocarbon being 0.01–1.5 theories based on the amount of organolead compound present; a theory being that amount of scavenger which provides 2 atoms of halogen for every lead atom in said fluid.

2. The composition of claim 1 wherein said poly(t-halo)hydrocarbon scavenger is a poly(t-bromo)alkane having 6 to 10 carbon atoms and 2 to 4 halogens.

3. The composition of claim 1 wherein said poly(t-halo)hydrocarbon scavenger is 2,3-dibromo-2,3-dimethylbutane.

4. A halohydrocarbon scavenger-containing tetraethyllead antiknock fluid wherein the scavenger components consist essentially of 0.1 theory of bromine as 2,3-dibromo-2,3-dimethylbutane, 0.4 theory of bromine as ethylene dibromide, and 1.0 theory of chlorine as ethylene dichloride; a theory being that amount of scavenger which provides 2 atoms of halogen for every lead atom present in said fluid.

5. A petroleum hydrocarbon fuel of the gasoline boiling range containing the composition of claim 1 in amount such that the lead content is between about 0.02 and 13.2 grams of lead per gallon of fuel.

6. A petroleum hydrocarbon fuel of the gasoline boiling range containing the composition of claim 1 in amount such that the lead content is between about 0.02 and 13.2 grams of lead per gallon of fuel and wherein the poly(t-halo)hydrocarbon is a bromoalkane having 6 to 10 carbon atoms and 2 to 4 halogen atoms.

7. A petroleum hydrocarbon fuel of the gasoline boiling range containing the antiknock fluid composition of claim 4.

References Cited in the file of this patent

UNITED STATES PATENTS 2,479,900     Calingaert et al. _____ Aug. 23, 1949

FOREIGN PATENTS 563,997     Great Britain _____ Sept. 8, 1944